(12) United States Patent
Ray et al.

(10) Patent No.: US 12,001,342 B2
(45) Date of Patent: *Jun. 4, 2024

(54) ISOLATED PERFORMANCE DOMAINS IN A MEMORY SYSTEM

(71) Applicant: Micron Technology, Inc., Boise, ID (US)

(72) Inventors: Anirban Ray, Santa Clara, CA (US); Parag R. Maharana, Dublin, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 17/693,130

(22) Filed: Mar. 11, 2022

(65) Prior Publication Data
US 2022/0197820 A1    Jun. 23, 2022

Related U.S. Application Data

(63) Continuation of application No. 16/893,757, filed on Jun. 5, 2020, now Pat. No. 11,275,696, which is a
(Continued)

(51) Int. Cl.
*G06F 12/1009* (2016.01)
*G06F 9/30* (2018.01)
(Continued)

(52) U.S. Cl.
CPC ...... *G06F 12/1009* (2013.01); *G06F 9/30003* (2013.01); *G06F 9/45558* (2013.01); *G06F 9/5016* (2013.01); *G06F 12/0246* (2013.01); *G06F 2009/45583* (2013.01); *G06F 2212/657* (2013.01)

(58) Field of Classification Search
CPC ............ G06F 12/1009; G06F 12/0246; G06F 2009/45583; G06F 2212/657; G06F 9/30003; G06F 9/45558; G06F 9/5016
See application file for complete search history.

(56) References Cited

U.S. PATENT DOCUMENTS

| | | |
|---|---|---|
| 4,937,820 A | 6/1990 | Kawula |
| 5,727,150 A | 3/1998 | Laudon et al. |
| | (Continued) | |

OTHER PUBLICATIONS

Isolated Performance Domains in a Memory System, U.S. Appl. No. 16/035,469, filed Jul. 13, 2018, Anirban Ray et al.
(Continued)

*Primary Examiner* — Edward J Dudek, Jr.
(74) *Attorney, Agent, or Firm* — Greenberg Traurig

(57) ABSTRACT

A computing system having memory components, including first memory and second memory. The computing system further includes a processing device, operatively coupled with the memory components, to: store a memory allocation value in association with a context of executing instructions; execute a set of instructions in the context; allocate, for execution of the set of instructions in the context, an amount of memory, including an amount of the first memory and an amount of the second memory; and access the amount of the second memory via the amount of the first memory during the execution of the set of instructions in the context.

21 Claims, 7 Drawing Sheets

Related U.S. Application Data continuation of application No. 16/035,469, filed on Jul. 13, 2018, now Pat. No. 10,691,611.

(51) Int. Cl.
 *G06F 9/455* (2018.01)
 *G06F 9/50* (2006.01)
 *G06F 12/02* (2006.01)

(56) References Cited

U.S. PATENT DOCUMENTS

| | | | |
|---|---|---|---|
| 9,176,764 | B1 | 11/2015 | Jorgensen |
| 9,910,618 | B1 | 3/2018 | Curley et al. |
| 10,019,368 | B2 | 7/2018 | Hagersten et al. |
| 10,691,611 | B2 | 6/2020 | Ray et al. |
| 11,275,696 | B2 * | 3/2022 | Ray ................. G06F 9/5016 |
| 2003/0236961 | A1 * | 12/2003 | Qiu .................. H04L 67/5682 711/158 |
| 2006/0095679 | A1 | 5/2006 | Edirisooriya |
| 2008/0276006 | A1 | 11/2008 | Choi |
| 2012/0047312 | A1 | 2/2012 | Nathuji et al. |
| 2012/0210068 | A1 | 8/2012 | Joshi et al. |
| 2014/0164621 | A1 | 6/2014 | Nakama |
| 2015/0095577 | A1 * | 4/2015 | Vijayrao ............ G06F 12/0842 711/129 |
| 2015/0106582 | A1 | 4/2015 | Mai et al. |
| 2015/0347303 | A1 * | 12/2015 | Liu ..................... G06F 3/0679 711/102 |
| 2016/0342364 | A1 | 11/2016 | Ono |
| 2016/0342443 | A1 | 11/2016 | McDermott |
| 2017/0031810 | A1 | 2/2017 | Bonzini et al. |
| 2018/0024919 | A1 | 1/2018 | Geml et al. |
| 2018/0027680 | A1 * | 1/2018 | Kumar ............... G06F 9/30036 361/807 |
| 2018/0032429 | A1 | 2/2018 | Liu et al. |
| 2018/0089087 | A1 | 3/2018 | Chang et al. |
| 2018/0292996 | A1 | 10/2018 | Mithal et al. |
| 2018/0336131 | A1 * | 11/2018 | Zaretsky ............ G06F 12/0811 |
| 2020/0019510 | A1 | 1/2020 | Ray et al. |
| 2020/0301848 | A1 | 9/2020 | Ray et al. |

OTHER PUBLICATIONS

Isolated Performance Domains in a Memory System, U.S. Appl. No. 16/893,757, filed Jun. 5, 2020, Anirban Ray et al.
Predictive Maintenance of Automotive Lighting, U.S. Appl. No. 16/538,108, filed Aug. 12, 2019, Poorna Kale et al.
Extended European Search Report, EP19833927.7, dated Feb. 23, 2022.
International Search Report and Written Opinion, PCT/US2019/040427, dated Oct. 25, 2019.
Vishal Gupta, et al. "HeteroVisor: Exploiting Resource Heterogeneity to Enhance the Elasticity of Cloud Platforms." Virtual Execution Environments, ACM, Mar. 14, 2015.

\* cited by examiner

ISOLATED PERFORMANCE DOMAINS IN A MEMORY SYSTEM

RELATED APPLICATIONS

The present application is a continuation application of U.S. patent application Ser. No. 16/893,757 filed Jun. 5, 2020 and issued as U.S. Pat. No. 11,275,696 on Mar. 15, 2022, which is a continuation of U.S. patent application Ser. No. 16/035,469 filed Jul. 13, 2018, issued as U.S. Pat. No. 10,691,611 on Jun. 23, 2020, and entitled "Isolated Performance Domains in a Memory System", the entire disclosures of which applications are hereby incorporated herein by reference.

FIELD OF THE TECHNOLOGY

At least some embodiments disclosed herein relate to memory systems in general, and more particularly, but not limited to isolated performance domains in a memory system.

BACKGROUND

A memory sub-system can be a memory module, such as a dual in-line memory module (DIMM), a small outline DIMM (SO-DIMM), or a non-volatile dual in-line memory module (NVDIMM). A memory sub-system can be a storage system, such as a solid-state drive (SSD), or a hard disk drive (HDD). A memory sub-system can include one or more memory components that store data. The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM). In general, a host system can utilize a memory sub-system to store data at the memory components and to retrieve data from the memory components.

For example, a computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a particular type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

An operating system of a computer system can allow an application program to use virtual addresses of memory to store data in, or retrieve data from, memory components of one or more memory sub-systems of the computer system. The operating system maps the virtual addresses to physical addresses of one or more memory sub-systems connected to the central processing unit (CPU) of the computer system. The operating system implements the memory accesses specified at virtual addresses using the physical addresses of the memory sub-systems.

A virtual address space can be divided into pages. A page of virtual memory can be mapped to a page of physical memory in the memory sub-systems. The operating system can use a paging technique to access a page of memory in a storage device via a page of memory in a memory module. At different time instances, the same page of memory in a memory module can be used as proxy to access different pages of memory in the storage device or another storage device in the computer system.

A computer system can include a hypervisor (or virtual machine monitor) to create or provision virtual machines. A virtual machine is a computing device that is virtually implemented using the resources and services available in the computer system. The hypervisor presents the virtual machine to an operating system as if the components of virtual machine were dedicated physical components. A guest operating system runs in the virtual machine to manage resources and services available in the virtual machine, in a way similar to the host operating system running in the computer system. The hypervisor allows multiple virtual machines to share the resources of the computer system and allows the virtual machines to operate on the computer substantially independently from each other.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
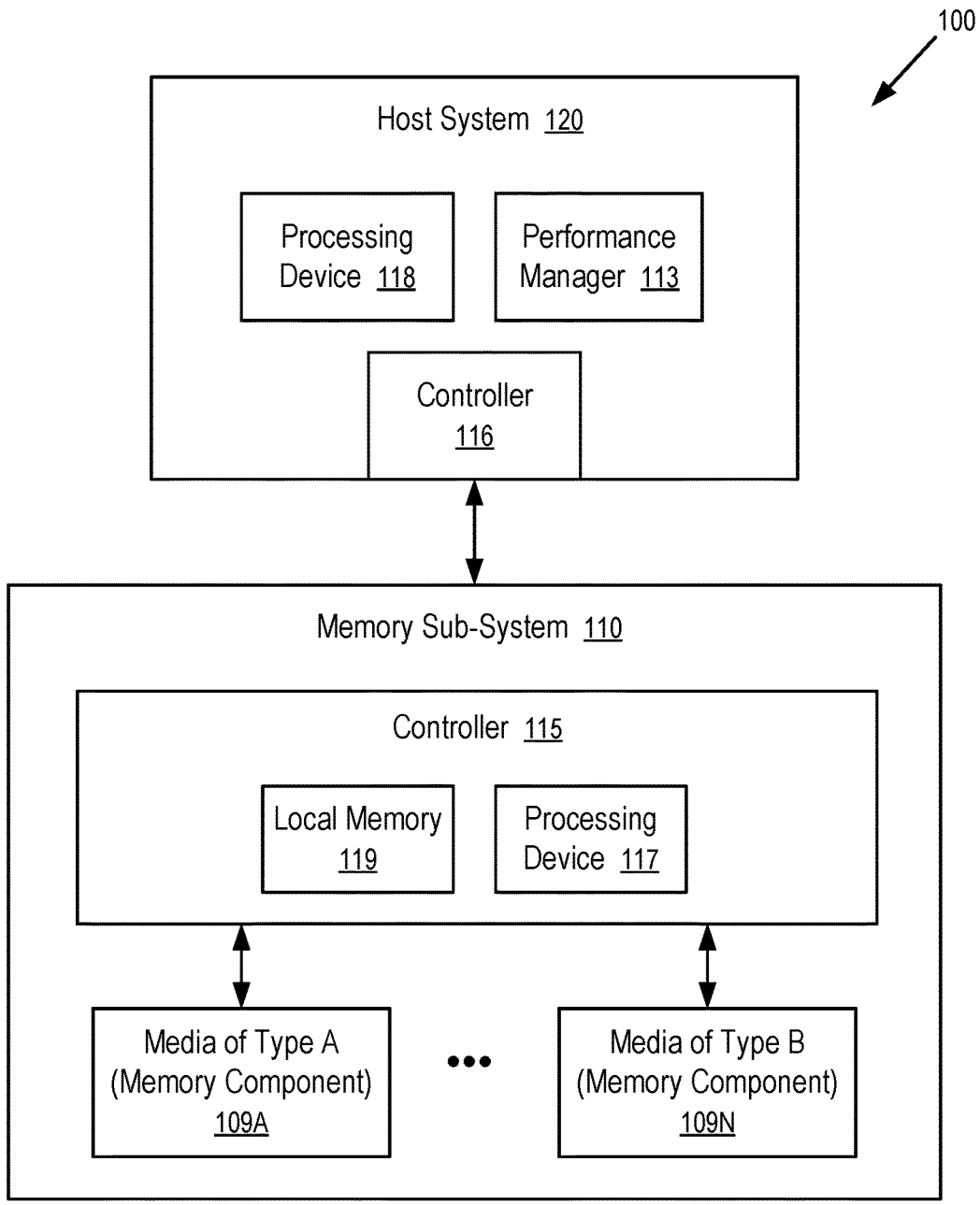
FIG. 1 illustrates an example computing system having a memory sub-system in accordance with some embodiments of the present disclosure.

At least some aspects of the present disclosure are directed to the use of performance policies of allocating memories of different types/performances according to predetermined memory ratios to access memory in one or more memory sub-systems. A memory sub-system is also hereinafter referred to as a "memory device". An example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc. Another example of a memory sub-system is a storage device that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

A conventional system can use a storage device, such as a hard drive, as virtual memory that is accessed through a memory module, such as DRAM. When an application accesses a page of virtual memory that is on the hard drive, the operating system can load the page from the hard drive to the DRAM and remap the page of the virtual memory to DRAM. Accessing data in the DRAM is faster than accessing data in the hard drive. Thus, after the page of the virtual memory is remapped to the DRAM, the application can access the data in the page of virtual memory with improved performance. However, different applications running in the system can compete for access to DRAM. Thus, memory access performances of a set of applications running in the system can interfere with each other.

At least some aspects of the present disclosure address the above and other deficiencies by implementing performance policies that specify ratios of memories of different types/performances. Memory are allocated according to the ratios for execution of instructions in different performance tiers. For example, an application running according to a performance policy for a high performance tier can be provided with memory with a high ratio between fast memory and slow memory; and another application running according to a performance policy for a low performance tier can be allocated with memory with a low memory ratio between fast memory and slow memory. When the two applications are running concurrently, each of the applications has its share of fast memory allocated according to its performance tier. Thus, the memory access performance of each application is substantially determined by the memory ratio; and the impact of memory access operations of one application on the memory performance of another application is reduced and/or eliminated. Thus, applications can run in their respective isolated memory performance domains characterized by the memory ratios.

FIG. 1 illustrates an example computing system 100 having a memory sub-system 110 in accordance with some embodiments of the present disclosure. The memory sub-system 110 can include media, such as memory components 109A to 109N. The memory components 109A to 109N can be volatile memory components, non-volatile memory components, or a combination of such. In some embodiments, the memory sub-system 110 is a memory module. Examples of a memory module includes a DIMM, NVDIMM, and NVDIMM-P. In some embodiments, the memory sub-system is a storage system. An example of a storage system is an SSD. In some embodiments, the memory sub-system 110 is a hybrid memory/storage sub-system. In general, the computing environment can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 120 and the memory sub-system 110. The host system 120 can further utilize an NVM Express (NVMe) interface to access the memory components 109A to 109N when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The host system 120 includes a processing device 118 and a controller 116. The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110.

In general, the controller 116 can send commands or requests to the memory sub-system 110 for desired access to memory components 109A to 109N. The controller 116 can further include interface circuitry to communicate with the memory sub-system 110. The interface circuitry can convert responses received from the memory sub-system 110 into information for the host system 120.

The controller 116 of the host system 120 can communicate with the controller 115 of the memory sub-system 110 to perform operations such as reading data, writing data, or erasing data at the memory components 109A to 109N and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory components 109A to 109N can include any combination of the different types of non-volatile memory components and/or volatile memory components. An example of non-volatile memory components includes a negative- and (NAND) type flash memory. Each of the memory components 109A to 109N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 109A to 109N can be based on any other type of memory such as a volatile memory. In some embodiments, the memory components 109A to 109N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 109A to 109N can be grouped as memory pages or data blocks that can refer to a unit of the memory component used to store data.

The controller 115 of the memory sub-system 110 can communicate with the memory components 109A to 109N to perform operations such as reading data, writing data, or erasing data at the memory components 109A to 109N and other such operations (e.g., in response to commands scheduled on a command bus by controller 116). The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processing device 117 (processor) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 109A to 109N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 109A to 109N. The controller 115 can further include host interface circuitry to communicate with the host system 120 via the physical host interface. The host interface circuitry can convert the commands received from the host system into command instructions to access the memory components 109A to 109N as well as convert responses associated with the memory components 109A to 109N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 109A to 109N.

The computing system 100 includes a performance manager 113 in the host system 120 that can manage memory access performance of executing instructions by enforcing ratios of faster memory (e.g., 109A) to slower memory (e.g., 109N) that are allocated for the execution of the instructions. In some embodiments, the controller 116 and/or the processing device 118 in the host system 120 includes at least a portion of the performance manager 113. For example, the controller 116 and/or the processing device 118 can include logic circuitry implementing the performance manager 113. For example, the processing device 118 (processor) of the host system 120 can be configured to execute instructions stored in memory for performing the operations of the performance manager 113 described herein. In some embodiments, the performance manager 113 is part of an operating system of the host system 120, a device driver, or an application.

The performance manager 113 can associate performance tiers of the execution of a set of instructions with memory ratios between memories of different types/performances that are allocated to the set of instructions. When the set of instructions is executed in a context that requires a particular performance tier, memories of different types/performances are allocated to the execution of the set of instructions in accordance with the memory ratio of the performance tier. The allocated memories of different types/performances can be uniformly addressed by the set of instructions using virtual addresses, as if a memory of a same type/performance were allocated for the execution of the set of instructions. The use of paging technique is limited within the memory swap between the allocated memories of different types/performances. The memory ratio determines the performance impact caused by the memory swap in the use of paging technique; and limiting the memory swap within the memory ratios of the performance tiers isolates the performance impact of the execution of one application on another. Further details with regards to the operations of the performance manager 113 are described below.

In one example, a central processing unit (CPU) can access two sets of memory provided in one or more memory sub-systems connected to the CPU. For example, one set of memory can be slower than the other set of memory; and the central processing unit (CPU) can be configured to access the slower set of memory via the faster set of memory using a paging technique. For example, one set of memory cannot be directly addressable by the CPU and is coupled to the other set of memory that is directly addressable by the CPU; and the central processing unit (CPU) can be configured to access a set of memory that is not directly addressable via the set of memory that is directly addressable in a way similar to the use of the paging technique. When a page of virtual memory being accessed is currently in the slower set of memory but not in the faster set of memory, a page in the faster set of memory can be used to service the page in the slower set of memory; and a device driver is used to fetch the data of the page from the slower set of memory, store the fetched page of data in the allocated page in the faster set of memory, such that the data access of the page of the virtual memory can be made via accessing the allocated page in the faster set of memory. When the number of pages in the faster set of memory and the number of pages in the slower set of memory are allocated and used according to a memory ratio for a running application, the performance manager 113 can limit the running application to use no more than the number of pages of the faster set of memory allocated according to the memory ratio. As a result, the running application is prevented from using excessive pages of the faster set of memory and degrading memory access performance of other running applications.

Figure 2:
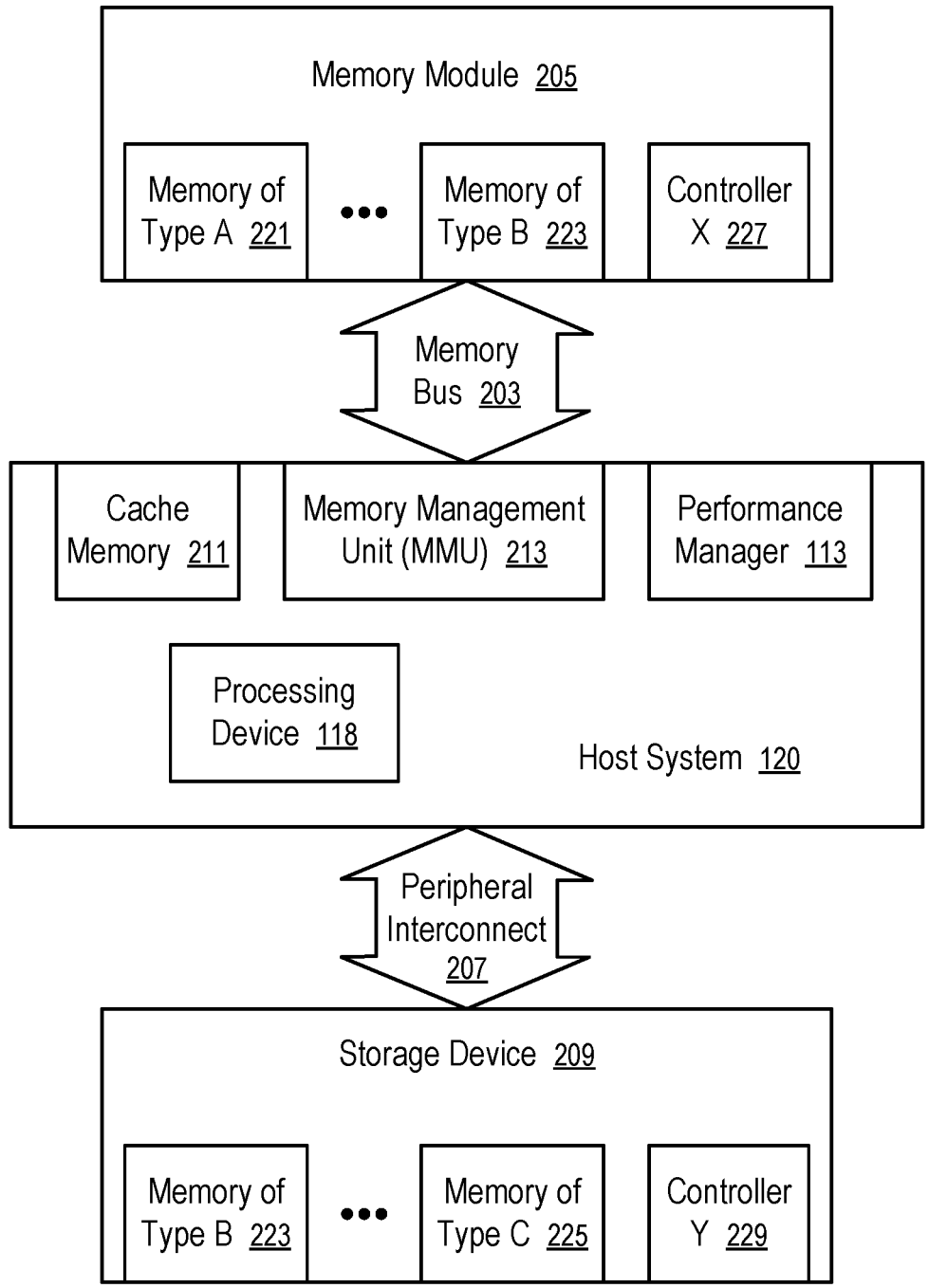
FIG. 2 shows a computing system having different types of memory and a performance manager to isolate performance domains in memory access in accordance with at least some embodiments disclosed herein.

FIG. 2 shows a computing system having different types of memory and a performance manager 113 to isolate performance domains in memory access in accordance with at least some embodiments disclosed herein.

The computing system of FIG. 2 includes a host system 120, a memory module 205 connected to the host system 120 via a memory bus 203, and a storage device 209 connected to the host system 120 via a peripheral interconnect 207. The storage device 209 and the memory module 205 are examples of the memory sub-system 110 illustrated in FIG. 1.

The host system 120 has a processing device 118, which can be a central processing unit or a microprocessor with one or more processing cores. The host system 120 can have a memory management unit 213 and cache memory 211. The memory management unit 213 and/or at least a portion of the cache memory 211 can be optionally integrated within the same integrated circuit package of the processing device 118.

The memory module 205 illustrated in FIG. 2 has multiple types of memory (e.g., 221 and 223). For example, memory of type A 221 is faster than memory of type B 223.

The memory bus 203 typically operates at a speed faster than the peripheral interconnect 207. For example, the memory bus 203 can be a double data rate bus; and the peripheral interconnect 207 can be a peripheral component interconnect express (PCIe) bus, a serial advanced technology attachment (SATA) bus, a universal serial bus (USB) bus, and/or a storage area network. Memory of type B 223 in the memory module 205 can be accessed at a speed faster than accessing memory of type B 223 in the storage device 209.

The storage device 209 illustrated in FIG. 2 has multiple types of memory (e.g., 223 and 225). For example, memory type B 223 is faster than memory type C 225.

In general, a plurality of memory modules (e.g., 205) can be coupled to the memory bus 203; and a plurality of storage devices (e.g., 209) can be coupled to the peripheral interconnect 207. In some instances, the peripheral interconnect 207 and the storage devices (e.g., 209) are optional and can be absent from the computing system. In other instances, the memory bus 203 the memory modules (e.g., 205) can be optional and can be absent from the computing system.

In a possible configuration when a plurality of memory modules (e.g., 205) are coupled to the memory bus 203, one of the memory modules (e.g., 205) has memory of type A 221; and another of the memory modules has memory of type B 223 that is accessible at a speed lower than the memory of type A 221 in a separate memory module (e.g., 205).

Similarly, in a possible configuration when a plurality of storage devices (e.g., 205) are coupled to the peripheral interconnect 207, one of the storage device (e.g., 209) has memory of type B 223, and another of the storage devices has memory of type C 225 that is accessible at a speed lower than the memory of type B 221 in a separate storage device (e.g., 209).

The processing device 118 and/or the MMU 213 are configured via instructions (e.g., an operating system and/or one or more device drivers) to access a portion of memory in the computer system via another portion of memory in the computer system using a paging technique and/or a memory map interface.

For example, memory of type B 223 of the memory module 205 can be accessed via memory of type A 221 of the memory module 205 (or another memory module).

For example, memory of type B 223 of the storage device 207 can be accessed via memory of type A 221 of the memory module 205 and/or via memory of type B 223 of the memory module 205.

For example, memory of type C 225 of the storage device 207 can be accessed via memory of type A 221 of the memory module 205, via memory of type B 223 of the memory module 205, and/or via memory of type B 223 of the storage device 207 (or another storage device).

For example, in some instances, memory of type A 221 and memory of type B 223 in the same memory module 205 (or different memory modules) are addressable directly and separately over the memory bus 203 by the memory management unit 213 of the processing device 118. However, since the memory of type B 223 is slower than memory of type A 221, it is desirable to access the memory type B 223 via the memory of type A 221.

In other instances, memory of type B 223 of the memory module 205 is accessible only through addressing the memory of type A 221 of the memory module 205 (e.g., due to the size restriction in the address portion of the memory bus 203).

A controller X 227 can be provided in the memory module 205 to manage data transfer between the memory of type A 221 and the memory of type B 223 within the memory module 205, especially when the memory of type B 223 of the memory module 205 is not directly addressable using the memory bus 203.

In one variation, the memory (e.g., 221 and 223) of the memory module 205 can have the same performance individually within the memory module 205; however, the memory management unit 213 and/or the processing device 118 are restricted to access via the memory 223 via the memory 221 (e.g., due to the size restriction in the address portion of the memory bus 203). Thus, the memory 223 appears to be slower than the memory 221 to the processing device 118.

In general, the memory sub-systems (e.g., 205 and 209) can include media, such as memory (e.g., 221, . . . , 223, . . . , 225). The memory (e.g., 221, . . . , 223, . . . , 225) can includes volatile memory, non-volatile memory (NVM), and/or a combination of such. In some embodiments, the computer system includes at least one memory sub-system that is a storage device 209. An example of a storage device 209 is a solid-state drive (SSD). In some embodiments, the computer system includes at least one memory sub-system that is a hybrid memory/storage system configured as a memory module 205. The processing device 118 can write data to each of the memory sub-systems (e.g., 205 and 209) and read data from the memory sub-systems (e.g., 205 and 209) directly or indirectly.

The computing system of FIG. 2 can be used to implement a desktop computer, laptop computer, network server, mobile device, or such computing device that includes a memory and a processing device. The processing device 118 can read data from or write data to the memory sub-systems (e.g., 205 and 209).

The processing device 118 can be coupled to a memory sub-system (e.g., 209) via one or more physical interface (e.g., 203, 207).

As used herein, "coupled to" generally refers to a connection between components, which can be an indirect communicative connection or direct communicative connection (e.g., without intervening components), whether wired or wireless, including connections such as, electrical, optical, magnetic, etc.

Examples of a physical host interface include, but are not limited to, a serial advanced technology attachment (SATA) interface, a peripheral component interconnect express (PCIe) interface, universal serial bus (USB) interface, Fibre Channel, Small Computer System Interface (SCSI), Serial Attached SCSI (SAS), etc.

The physical host interface can be used to transmit data between the processing device 118 and the memory sub-system (e.g., 209). The computer system can further utilize an NVM Express (NVMe) interface to access the memory (e.g., 223, . . . , 225) when the memory sub-system 209 is coupled with the peripheral interconnect 207 via the PCIe interface. The physical host interface can provide an interface for passing control, address, data, and other signals between the memory sub-system (e.g., 209) and the processing device 118.

In general, a memory sub-system (e.g., 205 and 209) includes a printed circuit board that connects a set of memory devices, such as memory integrated circuits, that provides the memory (e.g., 221, . . . , 223, . . . , 225). The memory (e.g., 221, . . . , 223, . . . , 225) on the memory sub-system (e.g., 205 and 209) can include any combination of the different types of non-volatile memory devices and/or volatile memory devices.

An example of non-volatile memory devices includes a negative- and (NAND) type flash memory or a negative-or (NOR) type flash memory. A memory integrated circuit can include one or more arrays of memory cells, such as single level cells (SLCs), multi-level cells (MLCs), triple level cells (TLCs), quad-level cells (QLCs), etc. In some implementations, a particular memory device can include both an SLC portion and a MLC (or TLC or QLC) portion of memory cells. Each of the memory cells can store one or more bits of data used by the host system 120. Although non-volatile memory devices such as NAND type flash memory are described, the memory integrated circuits can be based on any other type of memory such as a volatile memory. In some implementations, the memory (e.g., 221, . . . , 223, . . . , 225) can include, but are not limited to, random access memory (RAM), read-only memory (ROM), dynamic random access memory (DRAM), static random access memory (SRAM), synchronous dynamic random access memory (SDRAM), phase change memory (PCM), magneto random access memory (MRAM), negative-or (NOR) flash memory, electrically erasable programmable read-only memory (EEPROM), and/or a cross-point array of non-volatile memory cells. A cross-point array of non-volatile memory can perform bit storage based on a change of bulk resistance, in conjunction with a stackable cross-gridded data access array. Additionally, in contrast to many Flash-based memory, cross point non-volatile memory can perform a write in-place operation, where a non-volatile memory cell can be programmed without the non-volatile memory cell being previously erased. Furthermore, the memory cells of the memory devices can be grouped as memory pages or data blocks that can refer to a unit of the memory device used to store data.

A memory sub-system (e.g., 205 or 209) can have a controller (e.g., 227 or 229) that communicate with the memory (e.g., 221, . . . , 223, . . . , 225) to perform operations such as reading data, writing data, or erasing data in the memory (e.g., 221, . . . , 223, . . . , 225) and other such operations, in response to requests, commands or instructions from the processing device 118 and/or the memory management unit (MMU) 213. The controller (e.g., 227 or 229) can include hardware such as one or more integrated circuits and/or discrete components, a buffer memory, or a combination thereof. The controller (e.g., 227 or 229) can be a microcontroller, special purpose logic circuitry (e.g., a field programmable gate array (FPGA), an application specific integrated circuit (ASIC), etc.), or another suitable processor. The controller (e.g., 227 or 229) can include one or more processors (processing devices) configured to execute instructions stored in local memory.

The local memory of the controller (e.g., 227 or 229) can include an embedded memory configured to store instructions for performing various processes, operations, logic flows, and routines that control operation of the memory sub-system (e.g., 205 or 209), including handling communications between the memory sub-system (e.g., 205 or 209) and the processing device 118/MMU 213, and other functions described in greater detail below. The local memory 219 of the controller (e.g., 227 or 229) can include read-only memory (ROM) for storing micro-code and/or memory registers storing, e.g., memory pointers, fetched data, etc.

While the example memory sub-systems (e.g., 205 and 209) in FIG. 2 have been illustrated as including controllers (e.g., 227 and 229), in another embodiment of the present disclosure, a memory sub-system (e.g., 205 or 209) may not include a controller (e.g., 227 or 229), and can instead rely upon external control (e.g., provided by the MMU 213, or by a processor or controller separate from the memory sub-system (e.g., 205 or 209)).

In general, the controller (e.g., 227 or 229) can receive commands, requests or instructions from the processing device 118 or MMU 213 in accordance with a standard communication protocol for the communication channel (e.g., 203 or 207) and can convert the commands, requests or instructions in compliance with the standard protocol into detailed instructions or appropriate commands within the memory sub-system (e.g., 205 or 209) to achieve the desired access to the memory (e.g., 221, . . . , 223, . . . , 225). For example, the controller (e.g., 227 or 229) can be responsible for operations such as wear leveling operations, garbage collection operations, error detection and error-correcting code (ECC) operations, encryption operations, caching operations, and address translations between a logical block address and a physical block address that are associated with the memory (e.g., 221, . . . , 223, . . . , 225). The controller (e.g., 227 or 229) can further include host interface circuitry to communicate with the processing device 118 via the physical host interface. The host interface circuitry can convert the commands received from the processing device 118 into command instructions to access the memory devices (e.g., 221, . . . , 223, . . . , 225) as well as convert responses associated with the memory devices (e.g., 221, . . . , 223, . . . , 225) into information for the processing device 118.

The memory sub-system (e.g., 205 or 209) can also include additional circuitry or components that are not illustrated. In some implementations, the memory sub-system (e.g., 205 or 209) can include a cache or buffer (e.g., DRAM) and address circuitry (e.g., a row decoder and a column decoder) that can receive an address from the controller (e.g., 227 or 229) or the MMU 213 and decode the address to access the memory (e.g., 221, . . . , 223, . . . , 225).

In one example, the peripheral interconnect 207, or the memory bus 203, has one or more connectors to provide the memory sub-system (e.g., 209 or 205) with power and/or communicate with the memory sub-system (e.g., 209 or 205) via a predetermined protocol; and the memory sub-system (e.g., 209 or 205) has one or more connectors to receive the power, data and commands from the processing device 118. For example, the connection between the connector on the peripheral interconnect 207 and the connector on a memory sub-system (e.g., 209) can utilize a PCIe bus or a SATA bus.

In general, the processing device 118 can execute one or more operating systems to provide services, including acceleration of memory access in which a portion of memory in the computer system is accessed via another portion of memory in the computer system using a paging technique and/or a memory map interface, as further discussed below.

Figure 3:
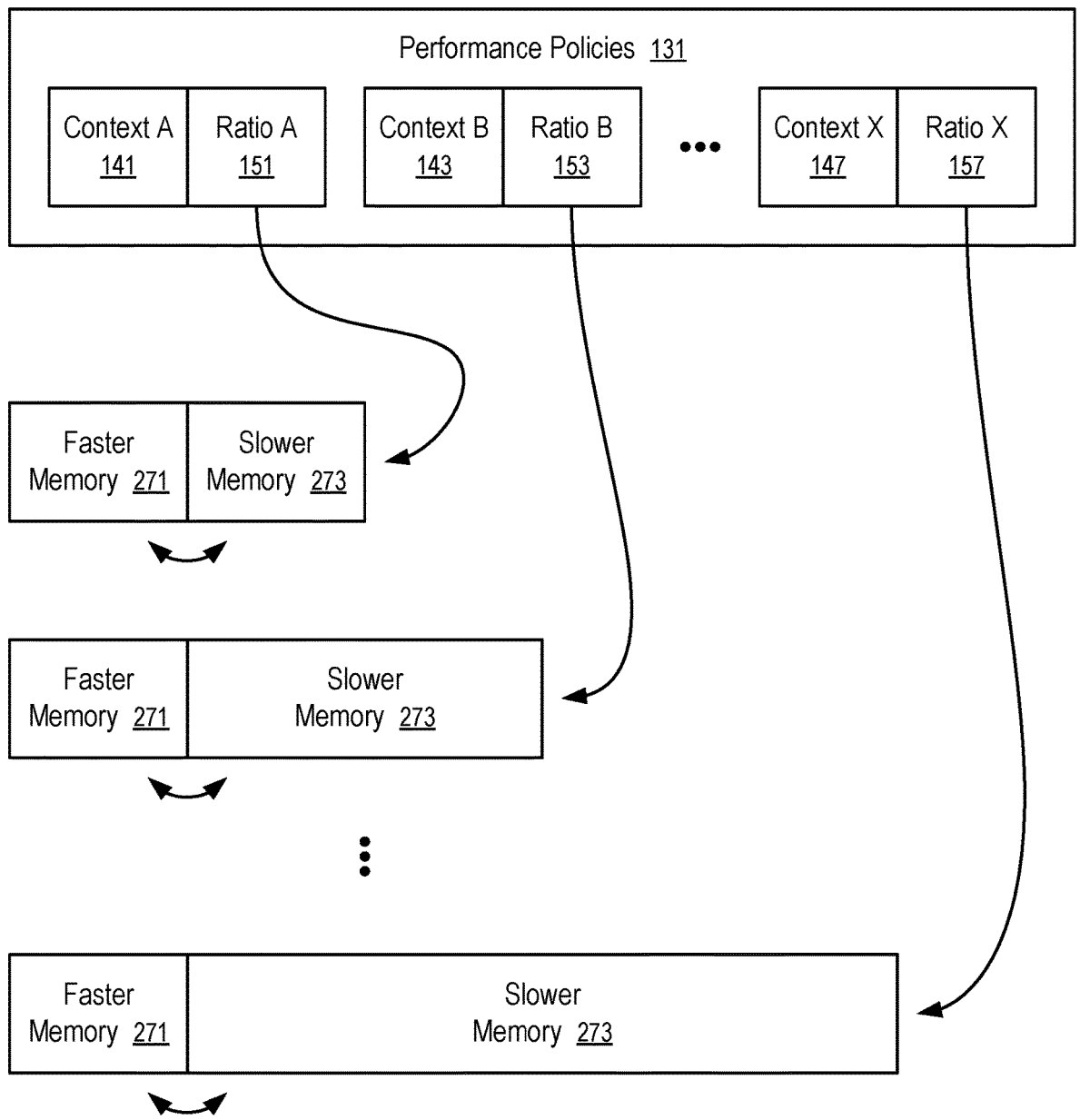
FIG. 3 illustrates performance policies that control memory access performances using different memory ratios.

The performance manager 213 limits the ratio between faster memory and slower memory used by a running instance of a set of instructions based on a predetermined memory ratio specified in a performance policy, such as the performance policies illustrated in FIG. 3.

FIG. 3 illustrates performance policies 131 that control memory access performances using different memory ratios.

The performance policies 131 identify different contexts (e.g., 141, 143, . . . , 147) in which instructions can be executed. A context is the circumstances that form the setting for the execution of the instructions. A context can be identified based on user, application, account, and/or virtual machine. For example, one context can be the execution of a particular application; another context can be the execution of any applications in a particular account; and a further context can be the execution of any applications by a particular user in a particular virtual machine.

For a context 141 (143, . . . , or 147), the performance policies 131 identify a memory ratio 151 (153, . . . , or 157) between faster memory 271 and slower memory 273. For example, each virtual machine or user account can be identified as a context 141 (143, . . . , or 147) and assigned a memory ratio 151 (153, . . . , or 157) for operating systems and/or applications running in the virtual machine or user account.

For example, the slower memory 273 can be the memory 223 in the memory module 205 and the faster memory 271 be the memory 221 in the same memory module 205 (or another memory module connected to the same memory bus 203 as the memory module 205).

For example, the slower memory can be the memory 223 in the storage device 209; and the faster memory can be the memory 223 of the same type in the memory module 205, or the memory 221 in the memory module 205.

For example, the slower memory can be the memory 225 in the storage device 209; and the faster memory can be the memory 223 in the same storage device 209 or another storage device connected to the peripheral interconnect 207, or memory (e.g., 223 or 221) in the memory module 205.

For example, when an instance of instruction execution in the context 141 requires an amount of memory, the combination of the faster memory 271 and the slower memory 273 used for the execution instance is limited by the ratio 151. When the slower memory 273 for the execution instance is accessed via the faster memory 271, the number of times of loading pages from the slower memory 273 to the faster memory 271 to access the slower memory 273 allocated to the execution instance is determined by the ratio 151.

For example, the ratios between faster memory 271 and slower memory 273 can be 1:1, 1:2, 1:4, etc. When the ratio is 1:4, four pages of the slower memory 273 share one page of the faster memory 271; and the one page of the faster memory 271 is responsible for providing memory access to an average of four pages of the slower memory 273 through paging technique or memory swap.

In general, a set of instructions can be executed under different contexts. For example, when the instructions are executed in a context that requires a memory ratio 1:2, four pages of slower memory 273 can be accessed through two pages of faster memory 271. When the instructions are executed in a context that requires a memory ratio 1:4, four pages of slower memory 273 can be accessed through one page of faster memory 271, which provides a lower tier of memory access performance than the memory ratio 1:2.

In some instances, the memory requested by the instructions is allocated on the slower memory 273; and the faster memory 271 is allocated when the slower memory 273 is accessed. However, the allocation of the faster memory 271 is limited by the memory ratio for the execution of the instructions. For example, when the instructions require four pages of memory, four pages of slower memory 273 are allocated for the instructions. When instructions are active and the memory ratio for their execution is 1:2, at most 2 pages of faster memory 271 can be used to access the four pages of the slower memory 273. When the instructions are actively using less than two pages of the faster memory 271 in a time period, one or more pages of the faster memory 271 can be unloaded to the slower memory 273.

In some instances, the memory allocated for the execution of the instructions is a combination of faster memory 271 and slower memory 273 with a memory ratio determined by the context of the execution. Swapping is performed when a page in the slower memory 273 is accessed.

For example, the execution of the instructions requests memory access at an address that is currently in a page of the slower memory 273, a page of content in the faster memory 271 allocated for the execution of the instructions can be swapped with the page of the slower memory 273 such that the address is now remapped to the page of the faster memory 271. After the swap, the addresses previously refer to the page of the faster memory are remapped to the page of the slower memory 273; and the addresses previously refer to the page of the slower memory 273 are remapped to the page of the faster memory 271.

In some instances, the swapping of the content in a page of faster memory 271 and the content in a page of slower memory 273 can be performed by using a free page in the slower memory 273 or in the faster memory 271.

For example, the content in a page of faster memory 271 can be copied to the free page in the slower memory 273; after the content in the page of slower memory 273 is copied to the page of faster memory 273, the page of slower memory 273 can be freed. The addresses mapped to the page of the slow memory 273 before the swap can be remapped, after the swap, to the page of the faster memory 271; and the address mapped to the page of the faster memory 271 before the swap can be remapped, after the swap, to the free page to which the content of the page of faster memory 273 is copied.

For example, the content in a page of slow memory 273 can be copied to the free page in the faster memory 271; after the content in the page of faster memory 271 is copied to the page of slow memory 273, the page of faster memory 273 can be freed. The addresses mapped to the page of the slow memory 273 before the swap can be remapped, after the swap, to the free page to which the content of the page of slow memory 273 is copied; and the addresses mapped to the page of the faster memory 271 before the swap can be remapped, after the swap, to the page of the slower memory 273.

FIG. 3 illustrates an example of specifying memory ratios 151, 153, ..., 157 for the contexts 141, 143, ..., 147. In some implementations, each of the contexts 141, 143, ..., 147 is assigned a performance tier; and different performance tiers are pre-associated with different memory ratios. Thus, the memory ratios of the contexts can be determined from the performance tiers of the contexts.

Figure 4:
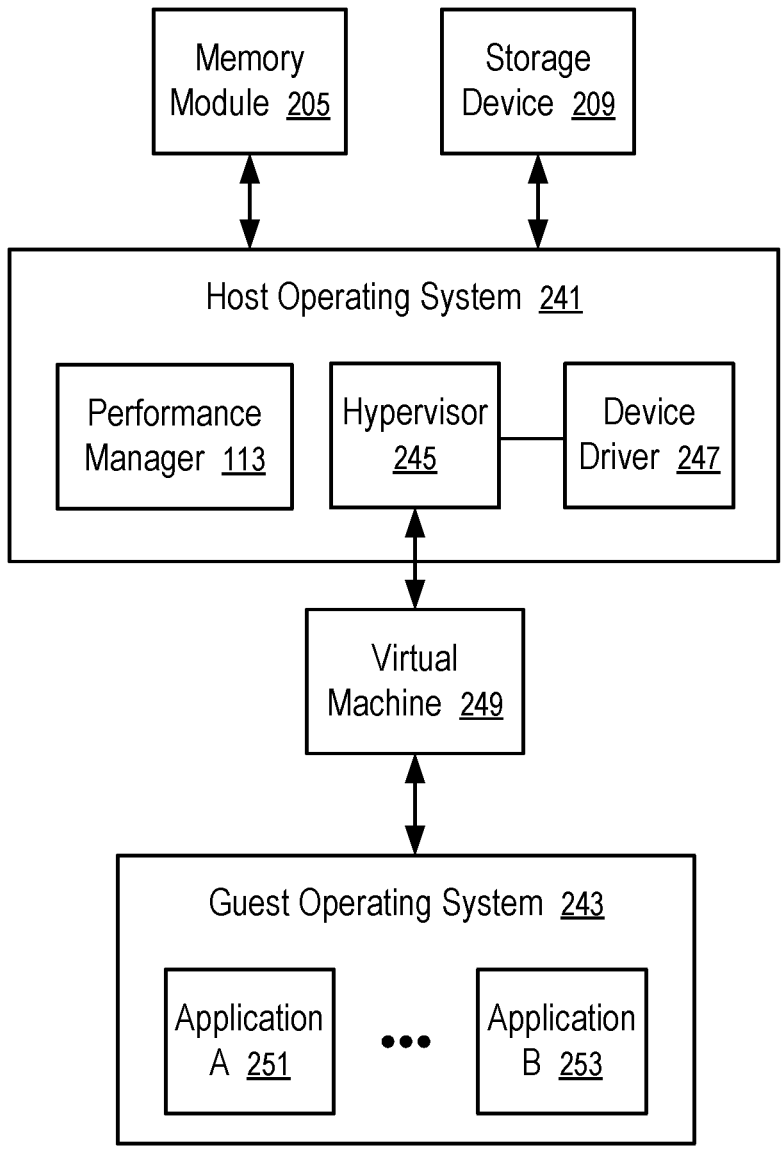
FIG. 4 shows a system having a performance manager configured to manager memory access performance via a hypervisor and/or a device driver.

FIG. 4 shows a system having a performance manager 113 configured to manager memory access performance via a hypervisor and/or a device driver. For example, the system of FIG. 4 can be implemented in a computer system of FIG. 1 or 2 using performance policies of FIG. 3.

The system of FIG. 4 includes a host operating system 241 that can run in the processing device 118 of the computer system of FIG. 1 or 2. The host operating system 241 includes one or more device drives (e.g., 247) that provides memory services using the memory (e.g., 221, ..., 223, ..., 225) of memory sub-systems, such as the memory module 205 and/or the storage device 209.

The host operating system 241 includes a hypervisor 245 that provisions a virtual machine 249. The virtual machine 249 has virtual hardware implemented via the resources and services provided by the host operating system 241 using the hardware of the computing system of FIG. 1 or 2. For example, the hypervisor 245 can provision virtual memory as part of the virtual machine 249 using a portion of the memory (e.g., 221, ..., 223, ..., 225) of memory sub-systems, such as the memory module 205 and/or the storage device 209.

The virtual machine 249 allows a guest operating system 243 to provide resources and/or services to applications (e.g., 251, ..., 253) running in the guest operating system 243, in a way as the operating system 243 running on a physical computing machine that has the same or similar set of hardware as provisioning in the virtual machine. The hypervisor 245 manages the mapping between the virtual hardware provisioned in the virtual machine and the services of hardware in the computing system managed by the host operating system 241.

FIG. 4 illustrates an instance in which a virtual machine 249 is provisioned by the hypervisor 245. In general, the hypervisor 245 can provision a plurality of virtual machines (e.g., 249) that can run the same guest operating system 243, or different guest operating systems (e.g., 243). Different sets of users and/or application programs can be assigned to use different virtual machines.

The virtual machines (e.g., 249) can be used in the identification of execution contexts (e.g., 141, 143, ..., 147). The performance manager 113 enforces the memory ratios (e.g., 151, 153, ..., 157) of the execution contexts (e.g., 141, 143, ..., 147).

In some instances, the host operating system 241 is specialized to provide services for the provisioning of virtual machines and does not run other application programs. Alternatively, the host operating system 241 can provide additional services to support other application programs, such as applications (e.g., 251, ..., 253).

The identifications of the applications can also be used in the identification of execution contexts (e.g., 141, 143, ..., 147).

The device driver 247 can be configured to access a page of slower memory 273 by loading the page into faster memory 271 such that memory operations performed in the virtual machine 249 are operated upon the faster memory 271. Preferably, the device driver 247 can predict when a page of the slower memory 273 is going to be used by the virtual machine 249 such that memory swap can be performed prior to the virtual machine 249 requesting to access the page.

Preferably, the memory swap between a page of slower memory 273 and a page of faster memory 271 is performed within a same memory sub-system, such as within the same memory module 205 or the same storage device 209, to avoid or reduce congestion in communication channels connected to the processing device 118, such as the memory bus 203 and/or the peripheral interconnect 207.

For example, the memory swap can be performed by swapping data between the slower memory 223 in the memory module 205 and the faster memory 221 in the memory module 205, under the control of a controller 227 in the memory module 205, in response to one or more command, request, or instruction from the device driver 247 and/or memory management unit (MMU) 213.

For example, the memory swap can be performed by swapping data between the slower memory 225 in the storage device 209 and the faster memory 223 in the storage device 209, under the control of a controller 229 in the storage device 209 in response to one or more command, request, or instruction from the device driver 247 and/or memory management unit (MMU) 213.

In one embodiment, the hypervisor 245 not only requests the device driver 247 to access a memory (e.g., 221, ..., 223, ..., or 225) in a memory sub-system (e.g., memory module 205 or storage device 209) but also provides the device driver 247 and/or the performance manager 113 with information that can be used to identify the context of the memory access such that the memory ratio for the context can be enforced.

Figure 5:
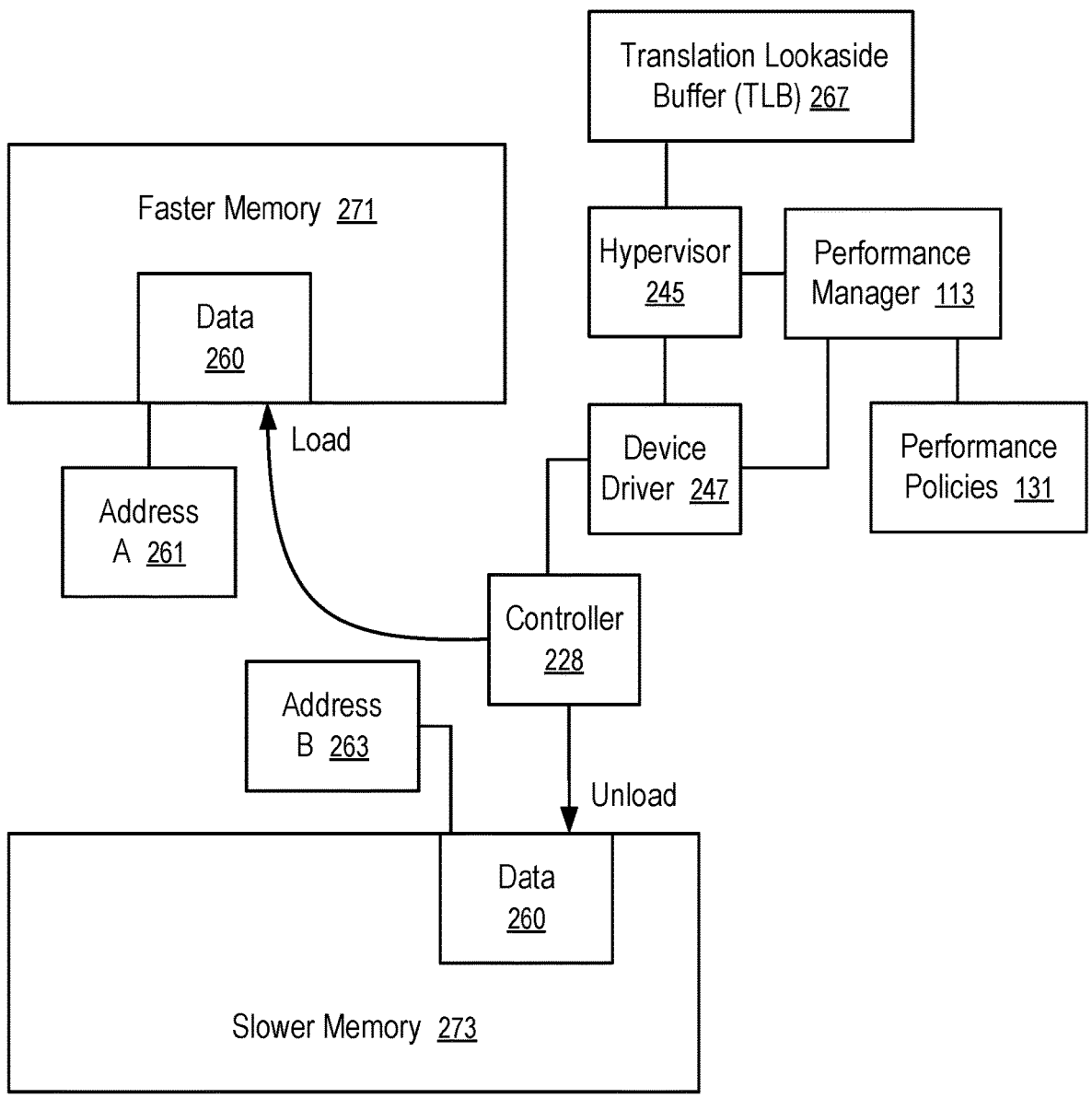
FIG. 5 shows a performance manager coupled to a device driver to manager memory access performance.

FIG. 5 shows a performance manager 113 coupled to a device driver 247 to manager memory access performance.

The hypervisor 245 in FIG. 5 is coupled to a translation lookaside buffer (TLB) 267 that defines the mapping between pages of virtual memory provisioned by the hypervisor 245 to the virtual machines (e.g., 249) and the pages in the memory (e.g., 271 or 273).

The processing device 118 can access a page of faster memory 271 at a physical address 261 faster than a page of slower memory 273 at a physical address 263. It is desirable, and in some instances required, to service the data 260 of a page of the slower memory 273 via a page of the faster memory 271.

The performance manager 113 has a set of performance policies 131 that identifies memory ratios between the faster memory 271 and the slower memory 273 for a context, such as a virtual machine 249 provisioned by the hypervisor 245.

When a virtual machine 249 is accessing the data 260 that is in the slower memory 273 but not in the faster memory 271, the hypervisor 245 requests the device driver 247 to load the data 260 from the slower memory 273 to the faster memory 271.

The device driver 247 communicates with a controller 228 (e.g., the controller 227 of the memory module 205, the controller 229 of the storage device 229, and/or the memory management unit (MMU) 213) to load the data 260 to the faster memory 271. Once the data 260 is in the faster memory 271, the hypervisor 245 can update the translation lookaside buffer (TLB) 267 to allow the translation of the virtual address of the page to the physical address 261 of the faster memory 271 such that the data 260 can be read and/or modified in the faster memory 271.

When the data 260 is not being used, the data 260 can be unloaded back to the slower memory 273, to save the changes made to the data 260 while the data 260 is being used in the faster memory 271.

The performance manager 113 uses the memory ratio (e.g., 141) to determine how many pages can be concurrent used in the faster memory 271 for an execution context, such as a virtual machine 249, based on the size of number of pages the slower memory 273 used for the execution context and the memory ratio. For example, if the virtual machine 249 is provisioned with n pages in the slower memory 273 and the memory ration is 1:x, the performance manager 113 limits the virtual machine to use no more than n/x pages of faster memory 271 in accessing the n pages of slower memory 273.

The hypervisor 245 provides information related to execution context to the performance manager 113. The performance manager 113 controls the device driver 247 to perform page swap under the restriction of the memory ratio specified in the performance policies 131 for the execution context.

Figure 6:
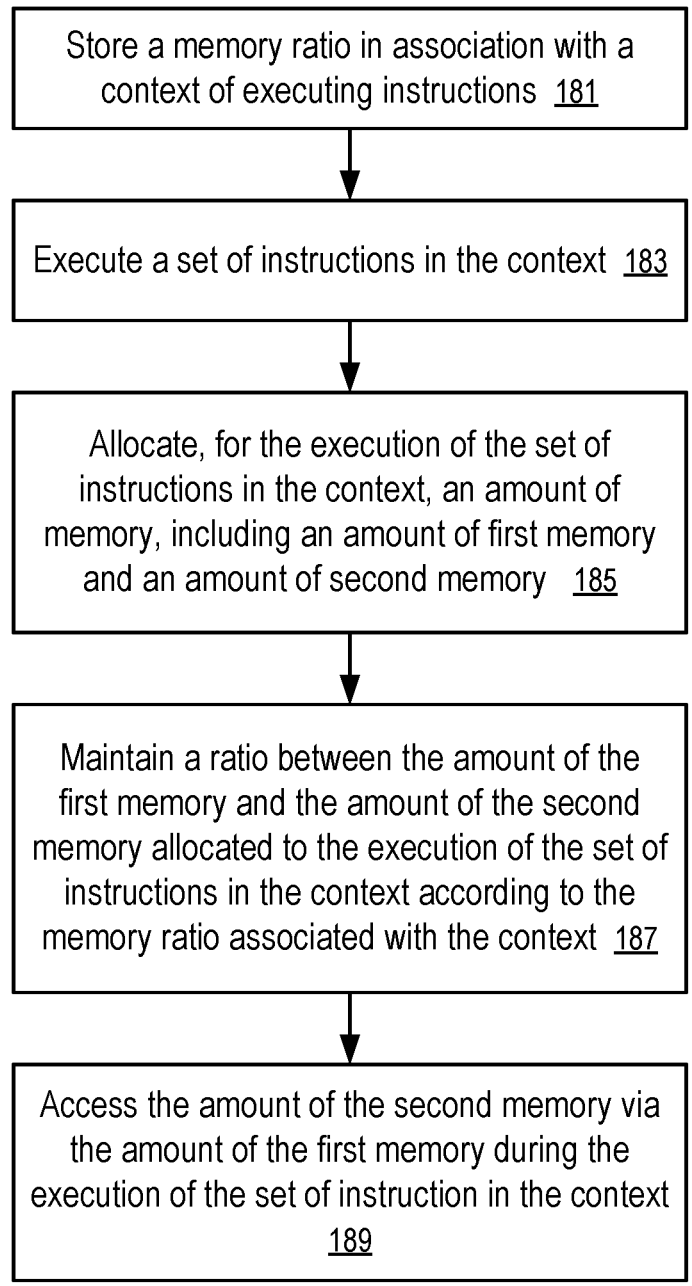
FIG. 6 shows a method to manage memory access performance.

FIG. 6 shows a method to manage memory access performance. The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 6 is performed at least in part by the performance manager 113 of FIG. 1 or 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 181, the performance manager 113 stores a memory ratio (e.g. 151, 153, ..., or 157) in association with a context (e.g., 141, 143, ..., 147) of executing instructions.

At block 183, the processing device 118 executes a set of instructions in the context (e.g., 143). For example, the set of instructions can implement a virtual machine 249 and/or run an application in the virtual machine 249 for a user account.

At block 185, the processing device 118 allocates, for the execution of the set of instructions in the context, an amount of memory, including an amount of first memory (e.g., 271) and an amount of second memory (e.g., 273).

At block 187, the performance manager 113 maintains, according to the memory ratio associated with the context, a ratio between the amount of the first memory and the amount of the second memory that are allocated to the execution of the set of instructions in the context.

At block 189, the processing device 118 accesses the amount of the second memory (e.g., 273) via the amount of the first memory (e.g., 271) during the execution of the set of instruction in the context.

In some implementations, a communication channel between the processing device 118 and a memory sub-system includes a computer network, such as a local area network, a wireless local area network, a wireless personal area network, a cellular communications network, a broadband high-speed always-connected wireless communication connection (e.g., a current or future generation of mobile network link); and the processing device 118 and the memory sub-system can be configured to communicate with each other using data storage management and usage commands similar to those in NVMe protocol.

A memory sub-system in general can have non-volatile storage media. Examples of non-volatile storage media include memory cells formed in an integrated circuit and magnetic material coated on rigid disks. Non-volatile storage media can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

The controller (e.g., 228, 227, or 229) of a memory sub-system (e.g., 205 or 209) can run firmware to perform operations responsive to the communications from the processing device 118. Firmware in general is a type of computer program that provides control, monitoring and data manipulation of engineered computing devices.

Some embodiments involving the operation of the controller 228 can be implemented using computer instructions executed by the controller 228, such as the firmware of the controller 228. In some instances, hardware circuits can be used to implement at least some of the functions. The firmware can be initially stored in the non-volatile storage media, or another non-volatile device, and loaded into the volatile DRAM and/or the in-processor cache memory for execution by the controller 228.

A non-transitory computer storage medium can be used to store instructions of the firmware of a memory sub-system (e.g., 209 or 205) and/or the instructions of the operating system (e.g., 241, 243) in general and the device driver 247 and the hypervisor 245 in particular. When the instructions are executed by the controller 228 and/or the processing device 118, the instructions cause the controller 228 and/or the processing device 118 to perform a method discussed above.

Figure 7:
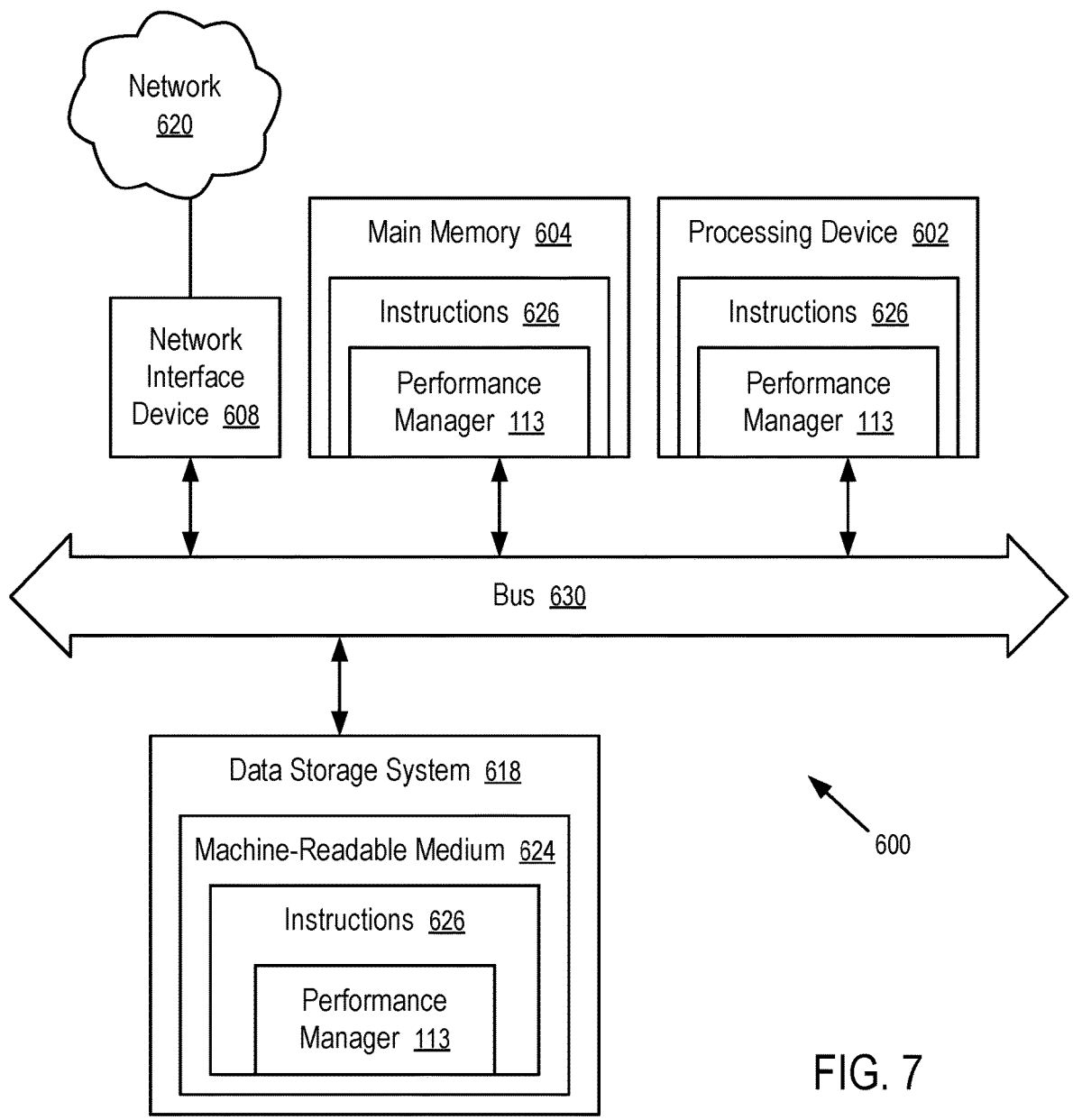
FIG. 7 is a block diagram of an example computer system in which embodiments of the present disclosure can operate.

FIG. 7 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a performance manager 113 (e.g., to execute instructions to perform operations corresponding to the performance manager 113 described with reference to FIGS. 1-6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a performance manager 113 (e.g., the performance manager 113 described with reference to FIGS. 1-6). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computing system, comprising:
 a plurality of memory components including a first memory and a second memory; and
 a processing device, operatively coupled with the plurality of memory components, to:
  store a memory allocation value;
  provision an amount of the second memory;
  limit an amount of first memory via the allocation value;
  access the amount of the second memory via the amount of the first memory;
  wherein the amount of the second memory is provisioned for executing a set of instructions, and the amount of the second memory is accessed, during the execution of the set of instructions, via the amount of the first memory.

2. The computing system of claim 1, wherein the amount of first memory accessible to execution of the set of instructions is limited in accordance with the memory allocation value.

3. The computing system of claim 2, wherein the memory allocation value is in association with an execution context specified at least in part by identification of an account; and when the set of instructions is executed in the account, the amount of the second memory that is provisioned and the amount of the first memory that is limited is specified in accordance with the memory allocation value.

4. The computing system of claim 2, wherein the memory allocation value is in association with an execution context specified at least in part by identification of a virtual machine; and when the set of instructions is executed in the virtual machine, a ratio between the amount of the second memory and the amount of the first memory is determined in accordance with the memory allocation value.

5. The computing system of claim 2, wherein the processing device is further configured to:
 assign a set of virtual memory addresses to the execution of the set of instructions, wherein at least a portion of the virtual memory addresses is mapped to a portion of the second memory; and
 in response to memory access requests made by the set of instructions using the portion of the virtual memory address,
  remap the portion of the virtual memory addresses to a portion of the first memory; and
  access the portion of the first memory in response to the set of instructions accessing the portion of the virtual memory address.

6. The computing system of claim 5, wherein the processing device is configured to remap the portion of the virtual memory addresses to the first memory by at least:
 copying content from the portion of the second memory to the portion of the first memory; and
 adjusting an address map to associate the portion of the virtual memory address with the portion of the first memory.

7. The computing system of claim 6, wherein the memory access requests include a request to store or retrieve data using a virtual memory address in the portion of the virtual memory addresses; and in response to the request, the processing device is configured to determine a physical address in the first memory according to the address map and the virtual memory address, and store or retrieve the data using the physical address.

8. The computing system of claim 2, wherein the processing device is further configured to:
 assign a set of virtual memory addresses representing the amount of the second memory allocated for execution of the set of instructions in association with an execution context;
 store an address map that maps a first portion of the virtual memory addresses to a first portion of the second memory and maps a second portion of the virtual memory addresses to a portion of the first memory;
 in response to the execution of the set of instructions in the context of accessing memory using the first portion of the virtual memory addresses:
  store content of the portion of the first memory to a second portion of the second memory;

load content of the first portion of the second memory into the portion of the first memory; and adjust the address map to map the first portion of the virtual memory addresses to the portion of the first memory and map the second portion of the virtual memory addresses to the second portion of the second memory.

9. The computing system of claim 2 wherein the amount of the first memory is determined according to the amount of the second memory and the memory allocation value.

10. The computing system of claim 2, wherein the first memory and the second memory are in a same memory module that is connected to a central processing unit via a memory bus.

11. The computing system of claim 10, wherein the second memory is not directly addressable on the memory bus by the central processing unit; and the first memory is directly addressable on the memory bus.

12. The computing system of claim 10, wherein the first memory is volatile dynamic random-access memory and the second memory is non-volatile cross-point memory.

13. The computing system of claim 2, wherein the first memory and the second memory are in separate memory modules that are connected to a central processing unit via a same memory bus.

14. The computing system of claim 2, wherein the first memory and the second memory are in separate memory systems that are connected to a central processing unit via separate communication channels.

15. A method, comprising:
storing, in a computing device comprising first memory and second memory, a plurality of memory allocation values;
executing, in the computing device, a set of instructions;
identifying, by the computing device, a first memory allocation value;
provisioning the execution of a set of instructions with an amount of the second memory;
allocating an amount of the first memory for execution of the set of instructions; and
providing memory access to the set of instructions executed by limiting memory access to the amount of the first memory via the first memory allocation value;
wherein the allocating of the amount of the first memory for execution of the set of instructions is in accordance with the first memory allocation value.

16. The method of claim 15, further comprising:
executing, in the computing device, the set of instructions in a second execution context of a plurality of execution contexts;
identifying, by the computing device, a second memory allocation value associated with the second execution context, the second memory allocation value being different from the first memory allocation value;
provisioning the second execution context with a second amount of the second memory;
allocating a second amount of the first memory for execution of the set of instructions in the second context in accordance with the second memory allocation value; and
providing memory access to the set of instructions executed in the second execution context using the second amount of the first memory and the second amount allocated to the second memory.

17. The method of claim 16, further comprising:
associating a plurality of memory performance tiers with the plurality of memory allocation values respectively;
associating a first execution context with the first memory allocation value in response to the first execution context having a first memory performance tier; and
associating the second execution context with the second memory allocation value in response to the second execution context having a second memory performance tier.

18. The method of claim 17, wherein the plurality of execution contexts are identified via at least one of: user, application, account, and virtual machine.

19. The method of claim 15, further comprising:
in response to a request, from the set of instructions executed, to access an address:
unloading data stored in the first memory to the second memory;
loading data associated with the address from the second memory to the first memory; and
providing access to the address by addressing the first memory.

20. A non-transitory computer storage medium storing instructions which, when executed by a computing system having first memory, and second memory, and a processing device, cause the computing system to:
associate a memory allocation value with execution of a set of instructions;
execute the set of instructions;
provision an amount of the second memory;
allocate an amount of the first memory for the execution of the set of instructions in accordance with the memory allocation value;
provide memory access to the execution of the set of instructions;
associate first memory addresses with a first memory portion in the amount allocated from the first memory; and
associate second memory addresses with a second memory portion in the amount allocated from the second memory.

21. The non-transitory computer storage medium of claim 20, wherein the instructions which, when executed by the computing system, cause the computing system further to:
in response to the execution of the set of instructions requesting memory access using the first memory addresses, address the first memory portion;
in response to the execution of the set of instructions requesting memory access using the second memory addresses,
unload first content from the first memory portion to a third memory portion in the second amount allocated from the second memory;
associate second memory addresses with the third memory portion in the second memory; and
load second content from the second memory portion to the first memory portion; and
associate second memory addresses with the first memory portion in the first memory; and
address the first memory portion.

* * * * *